United States Patent
Niimi et al.

(10) Patent No.: US 12,370,786 B2
(45) Date of Patent: Jul. 29, 2025

(54) TRANSPARENT DOUBLE-SIDED SELF-ADHESIVE SHEET

(71) Applicant: MITSUBISHI CHEMICAL CORPORATION, Tokyo (JP)

(72) Inventors: Kahoru Niimi, Shiga (JP); Hidejirou Yoshikawa, Shiga (JP); Tetsuya Yamaoka, Shiga (JP); Makoto Inenaga, Shiga (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 84 days.

(21) Appl. No.: 18/064,525

(22) Filed: Dec. 12, 2022

(65) Prior Publication Data
US 2023/0109620 A1    Apr. 6, 2023

Related U.S. Application Data

(63) Continuation of application No. 16/456,704, filed on Jun. 28, 2019, now abandoned, which is a (Continued)

(30) Foreign Application Priority Data

Apr. 13, 2010 (JP) ................................ 2010-091930
Feb. 15, 2011 (JP) ................................ 2011-030053
(Continued)

(51) Int. Cl.
*B32B 27/30* (2006.01)
*B32B 7/12* (2006.01)
(Continued)

(52) U.S. Cl.
CPC ................ *B32B 27/30* (2013.01); *B32B 7/12* (2013.01); *B32B 27/308* (2013.01); *C09J 7/24* (2018.01);
(Continued)

(58) Field of Classification Search
None
See application file for complete search history.

(56) References Cited

U.S. PATENT DOCUMENTS

| 6,358,606 B1 | 3/2002 | Sakai et al. |
| 2002/0025441 A1 | 2/2002 | Hieda et al. |

(Continued)

FOREIGN PATENT DOCUMENTS

| JP | 5 255649 | 5/1993 |
| JP | 2000-248241 | 9/2000 |

(Continued)

OTHER PUBLICATIONS

International Search Report Issued Jul. 12, 2011 in PCT/JP11/58410 Filed Apr. 1, 2011.
(Continued)

*Primary Examiner* — Scott R. Walshon
(74) *Attorney, Agent, or Firm* — Oblon, McClelland, Maier & Neustadt, L.L.P.

(57) ABSTRACT

A transparent double-sided self-adhesive sheet is provided which, when bonding to an adherend, not only excels in the ability to conform to steps or surface irregularities caused by a printing site, but also excels in workability such as cutting processability. A transparent double-sided self-adhesive sheet is proposed, having an intermediate resin layer (A) and pressure-sensitive adhesive layers (B) as front and reverse side layers, each of the layers being a layer having one or more species of (meth)acrylic acid ester series (co)polymer as the base resin, in which transparent double-sided self-adhesive sheet, the shear storage elastic modulus (G'(A)) at a frequency of 1 Hz of the intermediate resin layer (A) is higher than the pressure-sensitive adhesive layers (B) in a
(Continued)

temperature range of 0° C. to 100° C., and, the indentation hardness (ASKER C2 hardness) of the entire sheet is 10 to 80.

20 Claims, 1 Drawing Sheet

Related U.S. Application Data continuation of application No. 13/392,764, filed as application No. PCT/JP2011/058410 on Apr. 1, 2011, now abandoned.

(30) Foreign Application Priority Data

| Mar. 30, 2011 | (JP) | ................................. 2011-076009 |
| Mar. 30, 2011 | (JP) | ................................. 2011-076010 |

(51) Int. Cl.
  *C09J 7/24* (2018.01)
  *C09J 133/10* (2006.01)

(52) U.S. Cl.
  CPC ......... *C09J 133/10* (2013.01); *B32B 2457/00* (2013.01); *B32B 2457/202* (2013.01); *C09J 2203/318* (2013.01); *C09J 2301/124* (2020.08); *C09J 2433/006* (2013.01); *G02F 2202/28* (2013.01); *Y10T 428/24959* (2015.01); *Y10T 428/2891* (2015.01)

(56) References Cited

U.S. PATENT DOCUMENTS

| 2007/0182898 | A1* | 8/2007 | Higami | ................. B32B 27/365 |
| | | | | 349/117 |
| 2009/0087650 | A1 | 4/2009 | Inoue | |
| 2009/0238811 | A1* | 9/2009 | McDaniel | ................. A61L 2/00 |
| | | | | 424/94.2 |
| 2009/0274859 | A1* | 11/2009 | Husemann | ................. C09J 7/38 |
| | | | | 264/173.11 |
| 2010/0046198 | A1* | 2/2010 | Hoffman | ................. G09F 13/22 |
| | | | | 445/24 |
| 2010/0086705 | A1* | 4/2010 | Everaerts | ............... C09J 171/02 |
| | | | | 428/522 |
| 2012/0032889 | A1 | 12/2012 | Suwa | |

FOREIGN PATENT DOCUMENTS

| JP | 2001 234129 | 8/2001 |
| JP | 2002 97426 | 4/2002 |
| JP | 2002 348150 | 12/2002 |
| JP | 3107686 | 12/2004 |
| JP | 2005 292606 | 10/2005 |
| JP | 2006 169438 | 6/2006 |
| JP | 2007 105984 | 4/2007 |
| JP | 2008-095003 | 4/2008 |
| JP | 2008287670 | 11/2008 |
| JP | 2009 46620 | 3/2009 |
| JP | 2009155503 | 7/2009 |
| JP | 2011 80061 | 4/2011 |
| WO | 2006 112311 | 10/2006 |

OTHER PUBLICATIONS

Japanese Office Action Issued Jan. 18, 2012, in Japanese Patent Application JP 2011 076009 Filed Mar. 30, 2011.

Office Action dated Feb. 10, 2016, issued in corresponding European patent application No. 11763721.0.

Office Action issued Jul. 18, 2016, in Korean application No. 10-2012-7001432, filed on Apr. 1, 2011.

Table 8. Properties of Homopolymers, Ullmann's Polymers and Plastics—Products and Processes, 4 Volume Set, John Wiley & Sons. (Year: 2016).

* cited by examiner

TRANSPARENT DOUBLE-SIDED SELF-ADHESIVE SHEET

This is a continuation of U.S. application Ser. No. 16/456,704, filed Jun. 28, 2019, which is a continuation of U.S. application Ser. No. 13/392,764, filed Feb. 27, 2012, which is the National Stage of International Application No. PCT/JP2011/058410, filed Apr. 1, 2011, which claimed priority to Japanese patent Application Nos. 2010-091930, filed Apr. 13, 2010; 2011-030053, filed Feb. 15, 2011; 2011-076009, filed Mar. 30, 2011; and 2011-076010, filed Mar. 30, 2011, of which all of the disclosures are incorporated herein by reference in their entireties.

TECHNICAL FIELD

The present invention relates to a transparent double-sided self-adhesive sheet that can be used suitably for bonding structural members of an image display device such as an image display panel, a protective panel and a touch panel in flat image display devices that use such image display panels as LCDs, PDPs or ELs, such as, for instance, personal computers, mobile terminals (PDAs), gaming machines, televisions (TVs), car navigation systems, touch panels and pen tablets.

BACKGROUND ART

Currently, self-adhesive sheets are being used broadly in every field in order to produce a single body by adhering structural members thereof. Compared to a joining method whereby an adhesive in liquid form is coated or filled and dried, joining with a self-adhesive sheet has the merit of being simple; however, when adhesion is onto a structure having shapes such as surface asperities, sometimes aspects such as long-term reliability, in addition to workability and step-conforming ability, are poor.

For instance, in image display devices of personal computers, mobile terminals (PDAs), gaming machines, televisions (TVs), car navigation systems, touch panels, pen tablets and the like, a light-shielding film is provided in such a way that it runs in circle in the periphery along the screen frame. This light-shielding film is generally formed by the printing of a coat on the reverse side of a surface protection panel, the purpose thereof being to protect the image display unit, and since the thickness thereof is 5 μm or greater, the reverse side of the protective panel is generally not flat. For this reason, when the protective panel on the surface and the image display device unit are bonded into a single body via a self-adhesive sheet, the self-adhesive sheet cannot absorb the steps caused by the printing site, and sometimes air bubbles appear at the bonding site.

In order to raise the ability to conform to such steps and surface irregularities, it is desirable that the self-adhesive sheet is soft, but if too soft, cutting process or the like deteriorates. Conversely, if the self-adhesive sheet is hard, while there is no problem in the cutting process or the like, there is no close contact with the steps and surface irregularities due to a lack of softness, and, in addition, adhesive strength becomes difficult to obtain.

In prior art, a self-adhesive sheet using expanded foam has been described as a self-adhesive sheet having the ability to conform to surface irregularities and steps (for instance, Patent Document 1 and the like). However, since a self-adhesive sheet using expanded foam lacks transparency, such self-adhesive sheet cannot be used for an application that requires optical transmissibility.

In addition, a self-adhesive sheet is described in Patent Document 2, in which tensile elongation pertaining to conferring followability is defined; however there is a possibility of poor reliability in regard to foaming and peeling over time due to long-term retention.

Transparent self-adhesive agents or sheets for bonding an image display panel and a protective panel have been described in prior art, such as those in the following:

For instance, in Patent Document 3, as a self-adhesive sheet allowing a glass plate to be bonded at room temperature without requiring hot temporary bonding or high-temperature and high-pressure treatment by an autoclave, a self-adhesive sheet is described, provided with a first pressure-sensitive adhesive layer, a second pressure-sensitive adhesive layer formed on each side thereof, and a release film attached on the adhesive surface of each pressure-sensitive adhesive layer, the first pressure-sensitive adhesive layer being formed with a pressure-sensitive adhesive having such viscoelastic properties that the storage elastic modulus G' (1 Hz) at a measurement temperature of 20° C. and a frequency of 1 Hz is $5\times10^3$ to $5\times10^5$ Pa and that the storage elastic modulus G' ($10^{-7}$ Hz) at a standard temperature of 20° C. and a frequency of $10^{-7}$ Hz is $5\times10^1$ to $5\times10^3$ Pa, and the second pressure-sensitive adhesive layer being formed with a pressure-sensitive adhesive having such viscoelastic properties that the storage elastic modulus G' (1 Hz) at a measurement temperature of 20° C. is $1\times10^4$ to $5\times10^6$ Pa and that the storage elastic modulus G' ($10^{-7}$ Hz) at a standard temperature of 20° C. is $1\times10^4$ to $1\times10^6$ Pa.

A method is described in Patent document 4, whereby panels are tightly adhered to one another free of air bubble by forming a self-adhesive layer of low cohesive strength prior to ultraviolet light-crosslinking (the storage elastic modulus G' at a measurement temperature of 20° C. and a frequency of 1 Hz is $5\times10^3$ to $5\times10^5$ Pa and the storage elastic modulus G' at a standard temperature of 20° C. and a frequency of $10^{-7}$ Hz is $5\times10^1$ to $5\times10^3$ Pa), and after the tight adhesion, ultraviolet light (UV) is irradiated through the protective panel surface for solidification thereby altering the viscoelasticity thereof such that the storage elastic modulus G' at a measurement temperature of 20° C. and a frequency of 1 Hz is $1\times10^4$ to $1\times10^6$ Pa and the storage elastic modulus G' at a standard temperature of 20° C. and a frequency of $10^{-7}$ Hz is $1\times10^4$ Pa or greater.

In addition, Patent Document 5 describes the constitution of two species of self-adhesive layers having different cohesive strengths arranged at the front and the back of a gas barrier substrate, the constitution tightly adhering panels to one another free of air bubble with a first self-adhesive layer of low cohesive strength at the same time as blocking attacks of the volatile components from the protective panel with the gas barrier substrate and a second self-adhesive layer of a high cohesive strength.

As a self-adhesive sheet for bonding various optical members of display devices such as PDPs, which has excellent deformation recovery strength, Patent document 6 describes an optical member-bonding self-adhesive sheet for which the distortion restoration rate when extended 50% at a tension speed of 100 mm/min under an environment of 23° C.×50% RH and reverted at the same speed is 60% or greater.

Also as a self-adhesive sheet for bonding various optical members of display devices such as PDPs, which is difficult to deform by pressing the screen surface and even if it is deformed, the concavity recovers readily, Patent document 7 describes a self-adhesive sheet produced by crosslinking a self-adhesive composition containing a base polymer containing one or more species of (meth)acrylic acid ester series polymer, an acrylic crosslinking monomer and a crosslinking initiator, self-adhesive sheet being provided with such physical properties that, at any frequency of $10^{-1}$ Hz to $10^{-5}$ Hz in a 20° C. standard master curve, the shear storage elastic modulus is in a range from greater than $1.0 \times 10^4$ Pa to $1.0 \times 10^5$ Pa or lower and tan δ at a frequency of $10^{-3}$ Hz is $1.0 \times 10^{-1}$ or less.

PRIOR ART TECHNICAL REFERENCES

Patent Documents

[Patent document 1] Utility Model Registration No. 3107686
[Patent document 2] Japanese Patent Application Laid-open No. 2005-292606
[Patent document 3] Japanese Patent Application Laid-open No. 2001-234129
[Patent document 4] Japanese Patent Application Laid-open No. 2002-348150
[Patent document 5] Publication No. WO2006-112311
[Patent document 6] Japanese Patent Application Laid-open No. 2006-169438
[Patent document 7] Japanese Patent Application Laid-open No. 2009-046620

SUMMARY OF THE INVENTION

Problems to be Solved by the Invention

When adhering two image display structural members into a single body via a self-adhesive sheet, for instance, when adhering a liquid crystal panel and a touch panel or a protective panel into a single body, since the surface of the self-adhesive sheet has surface irregularities compared to the surface of glass or the like, if a self-adhesive sheet having such surface irregularities is bonded in this state to a liquid crystal panel or a touch panel, imprint or unevenness occurs on the surface of the liquid crystal panel or the touch panel due to the surface irregularities of the self-adhesive sheet surface, which is sometimes the cause of a poor appearance. In order to improve such a poor appearance, it is necessary that the self-adhesive sheet surface has such softness as to conform to the state of the adherend surface and flatten, when the self-adhesive sheet is bonded to the adherend.

Thus, an object of the present invention is to provide a novel transparent double-sided self-adhesive sheet, which, when bonding to an adherend, not only excels in the ability to conform to steps or surface irregularities caused by a printing site, but also excels in the ability to conform to the state of the adherend surface, and furthermore, also excels in workability such as cutting processability.

Means to Solve the Problems

The present invention, as means to solve the problems in consideration, proposes a transparent double-sided self-adhesive sheet having one or more species of (meth)acrylic acid ester series (co)polymer as the base resin, the indentation hardness (ASKER C2 hardness) for the entirety of the sheet being 10 to 80, and, after one side of the transparent double-sided self-adhesive sheet is adhered to a vertically standing SUS plate so as to have an adhesion surface area of 15 mm×20 mm, cured under an atmosphere of 60° C. for 15 minutes, then, a weight of 4.9 N is applied to the transparent double-sided self-adhesive sheet in the vertical direction and left alone for 60 minutes, the amount of creep of the adhesion position is 1 mm or greater but less than 15 mm.

Building-in the indentation hardness (Asker C2) and the amount of creep by shearing to fall in a given range allows the transparent double-sided self-adhesive sheet proposed by the present invention to be provided simultaneously with processability, the ability to follow surface irregularities, and furthermore, the ability to conform to the state of an adherend surface.

The present invention further proposes a transparent double-sided self-adhesive sheet provided with a constitution comprising two or more layered layers provided with different viscoelastic behaviors, each of the layers being a layer having one or more species of (meth)acrylic acid ester series (co)polymer as the base resin, the shear storage elastic modulus (G'(A)) at a frequency of 1 Hz of the intermediate layer being higher than the shear storage elastic modulus (G'(B)) of either one of the surface layers in the entire temperature region of the temperature range from 0° C. to 100° C., and the indentation hardness (ASKER C2 hardness) of the entire sheet being 10 to 80.

The present invention further proposes a transparent double-sided self-adhesive sheet having an intermediate resin layer (A) and pressure-sensitive adhesive layers (B) as front and reverse side layers, each of the layers being a layer having one or more species of (meth)acrylic acid ester series (co)polymer as the base resin, the shear storage elastic modulus (G'(A)) at a frequency of 1 Hz of the intermediate resin layer (A) is higher than the shear storage elastic modulus (G'(B)) of the pressure-sensitive adhesive layers (B) in the entire temperature region of the temperature range from 0° C. to 100° C., and the indentation hardness (ASKER C2 hardness) of the entire sheet is 10 to 80 and more preferably 10 to 60.

With two or more layers having different viscoelastic behaviors layered into one body, for instance, soft front and reverse side layers and a flexible intermediate resin layer (A) having a higher storage elastic modulus (G') than that of the front and reverse side layers, and an indentation hardness (Asker C2) built-in with a given range, these transparent double-sided self-adhesive sheets proposed by the present invention can be provided simultaneously with processability, the ability to follow surface irregularities, and furthermore, the ability to conform to the state of an adherend surface.

Thus, since the transparent double-sided self-adhesive sheets of the present invention can all be made not only to be transparent and have front and reverse sides that are self-adhesive surfaces, but also to have excellent ability to conform to steps caused by a printing site or the like or to the state of an adherend surface, and, moreover, to have excellent workability such as cutting processability, they can be used suitably for bonding a transparent panel such as a protective panel or a touch panel to an image display panel in flat image display devices that use such image display panels as LCDs, PDPs or ELs, such as, for instance, personal computers, mobile terminals (PDAs), gaming machines, televisions (TVs), car navigation systems, touch panels and pen tablets.

MODE TO CARRY OUT THE INVENTION

Figure 1:
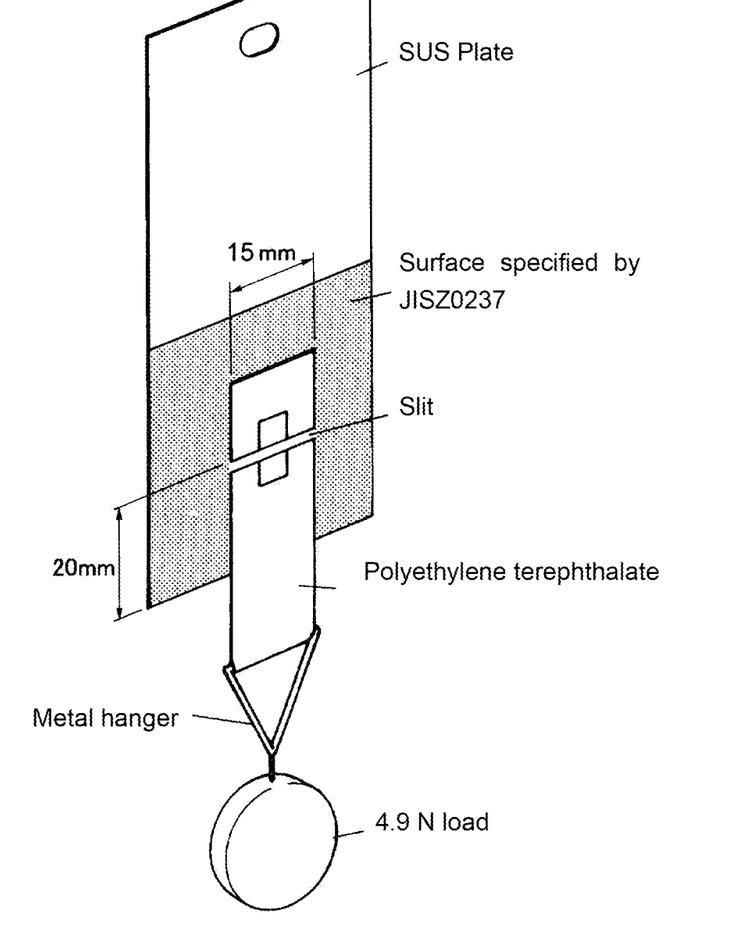
FIGURE SHOWS an overview of a device used for measuring the amount of creep in the Examples.

Hereafter, an exemplary embodiment of the present invention will be described; however, the present invention is not to be limited to the embodiment described below.

<Transparent Double-Sided Self-Adhesive Sheet>

The transparent double-sided self-adhesive sheet according to the present embodiment (hereafter referred to as "the present self-adhesive sheet") is a transparent, double-sided, self-adhesive sheet used for bonding two image display device structural members into one body.

(Indentation Hardness)

It is important for the indentation hardness of the present self-adhesive sheet that the ASKER C2 hardness is 10 to 80 as measured by stacking several sheets of the present self-adhesive sheet to a thickness of 6 mm±0.3 mm and vertically indenting a 2.5 mm-deep measurement terminal with an indentation load of 1000 g at an indentation speed of 3 mm/minute using an ASKER hardness gauge.

In so doing, the reason several sheets of the present self-adhesive sheet are stacked to a thickness of 6 mm±0.3 mm to be measured is that having the thickness in this range during the measurements eliminates the influence of the thickness, allowing the intrinsic indentation hardness of this member to be measured for comparisons.

If the ASKER C2 hardness of the present self-adhesive sheet is less than 10, although a deformation stress caused by an indentation is attenuated and conformed to, the sheet, being too soft, is also prone to unexpected deformation, leading to a deterioration of processability and storage stability, which is not desirable. Meanwhile, If the ASKER C2 hardness of the present self-adhesive sheet is greater than 80, the sheet, being too hard, the ability to conform to the adherend tends to be poor, which is not desirable. Within the range of the values described above, the transparent double-sided self-adhesive sheet can maintain a satisfactory appearance when bonded to an adherend, while displaying both excellent processability and conforming ability.

From such points of view, the indentation hardness of the present self-adhesive sheet is preferably 25 or greater or 70 or less, and in particular 30 or greater or 60 or less is more desirable.

In order to adjust the indentation hardness of the present self-adhesive sheet, it is effective to adjust the composition ratio of the acrylic acid ester copolymer that is to be the base polymer of the self-adhesive sheet, that is to say, in the case of a monolayer, the base polymer of the layer, and in the case of a multilayer constitution, the base polymer of each layer among intermediate layers and/or self-adhesive layers. For instance, in order to raise the indentation hardness, it suffices to increase the mixing amount of the monomer having a high glass transition temperature when polymerized. Conversely, to soften the sheet, it suffices to increase the composition ratio of the monomer having a low glass transition temperature. Also, raising the hardness by adding a reactive multifunctional monomer that is bifunctional or greater to raise the crosslinking density, lowering the hardness by softening with a plasticizer, and suitably adjusting the hardness with an additive such as an oligomer, are possibilities.

(Amount of Creep by Shearing of the Self-Adhesive Surface Boundary)

It is important for the present self-adhesive sheet that, after one side of the transparent double-sided self-adhesive sheet is adhered to a vertically standing SUS plate so as to have an adhesion surface area of 15 mm×20 mm, cured under an atmosphere of 60° C. for 15 minutes, then, a weight of 4.9 N is applied to the transparent double-sided self-adhesive sheet in the vertical direction and left for 60 minutes, the amount of creep of the adhesion position is 1 mm or greater but less than 15 mm.

Those with a shift amount of 1 mm or less have surfaces that tend to be hard due to a high cohesive strength and are not desirable since there is the risk that the ability to conform to an irregular surface is impaired, or when adhered to an adherend readily deformable by compression (for instance, liquid crystal cell, resistive touch panel, or the like), poor appearance is caused such as transfer of thickness unevenness. Meanwhile, those with a shift amount of 15 mm or greater, or those that drop within an hour, tend to be too soft due to a weak retention strength and are not desirable since there is the risk that the besides handleability when handling the self-adhesive sheet and cutting ability is impaired, creep deformation is caused during storing of the self-adhesive sheet or the member after bonding.

From these points of view, the shift amount is more preferably 1.5 mm or greater or 10 mm or less, of which 2 mm or greater or 8 mm or less is desirable.

In order to adjust the amount of creep by shearing of the self-adhesive surface boundary in the present self-adhesive sheet, it suffices to adjust the adhesive strength or the cohesive strength to the adherend, of the self-adhesive composition in a monolayer constitution or of the composition forming the surface adhesive layer of a layered constitution.

Concretely, in order to limit the amount of creep by shearing to be small, it suffices to raise the cohesive strength such that deformation is unlikely to be occurred, for instance by increasing the polar constituents in the base polymer that forms the self-adhesive surface boundary with the adherend, raising wettability or adhesive strength with respect to the adherend with an oligomer, in addition, increasing the highly cohesive constituent in the acrylic acid ester copolymer that is to be the base polymer, raising the degree of crosslink in the base polymer to the extent that the adhesive property is not impaired, and the like.

Conversely, in order to increase the amount of creep by shearing, for instance, decreasing the amount of highly cohesive constituent in the acrylic acid ester copolymer that is to be the base polymer, decreasing the degree of crosslink such that deformation is likely to be occurred, in addition, adding a tackifier or the like to confer fluidity at a given temperature, are adequate.

<Layered Constitution>

The present self-adhesive sheet may be a sheet comprising a single layer or may be a multilayered sheet comprising two or more layers that have been layered.

(Single Layer Constitution)

In order to form the present self-adhesive sheet with a single layer, a single layer having both softness and hardness needs to be formed. For this purpose, it is desirable to raise the molecular weight of the base resin to be extremely high and carry out forming in such a way that pseudo-crosslinks occur by the entanglement caused by the long chains of the base resin.

(Multilayer Constitution)

When forming the present self-adhesive sheet as a multilayered sheet, forming is preferably carried out so as to have at least an intermediate resin layer (A) and pressure-sensitive adhesive layers (B) as the front and reverse side layers.

More specifically, a transparent, double-sided self-adhesive sheet having two or more layers having different viscoelastic behaviors, concretely, an intermediate resin layer (A), and a pressure-sensitive adhesive layer (B) as either one of the surface layers or the front and reverse side layers, is adequate.

In the case of such a multilayer constitution, from the point of view of establishing processability and the ability to follow surface irregularities simultaneously, it is desirable that the shear storage elastic modulus (G'(A)) at a frequency of 1 Hz of the intermediate resin layer (A) is higher than the shear storage elastic modulus (G'(B)) of the pressure-sensitive adhesive layers (B) serving as the front and reverse side layers in the entire temperature region of the temperature range from 0° C. to 100° C.

In particular, the shear storage elastic modulus (G'(A)) of the intermediate resin layer (A) and the shear storage elastic modulus (G'(B)) of the pressure-sensitive adhesive layer (B) are preferably in the relationship indicated by the following formula (1), of which the relationship indicated by the following formula (2) is desirable, and from this, the relationship indicated by the following formula (3) in particular is more desirable.

$$1.1 < G'(A)/G'(B) < 80 \quad (1)$$

$$1.5 < G'(A)/G'(B) < 70 \quad (2)$$

$$2.0 < G'(A)/G'(B) < 60 \quad (3)$$

The shear storage elastic modulus (G') of the intermediate resin layer (A) is preferably $5 \times 10^3$ to $5 \times 10^8$ Pa in a temperature range of 0° C. to 100° C. If the entirety of the self-adhesive sheet is too soft, the self-adhesive resin attaches to the punch die or the slit blade with the self-adhesive material wrapping around the cut ends causing the release film to become unpeelable, a paste to be overflowed at the ends, and the like, it is desirable that the self-adhesive sheet per se is given stiffness with an intermediate layer having a suitable hardness to prevent these issues.

For such reasons, the storage elastic modulus (G') of the intermediate resin layer (A) at a temperature range of 0° C. to 100° C. is preferably $5 \times 10^3$ to $5 \times 10^8$ Pa, and in particular, $1 \times 10^4$ or greater, or, $1 \times 10^7$ or less is more desirable, of which $2 \times 10^4$ or greater, or, $1 \times 10^6$ or less is all the more desirable. Having such ranges of storage elastic modulus allows a suitable degree of processability to be conferred while the softness and the ability to conform to surface irregularities as a transparent double-sided self-adhesive sheet are maintained.

For both the intermediate resin layer (A) and the pressure-sensitive adhesive layer (B), in order to adjust the storage elastic modulus (G') of each layer, it suffices to adjust, for instance, the species, the composition ratio, or the like, of the copolymerization monomer forming the acrylic acid (co)polymer that is the base polymer.

It is desirable that the pressure-sensitive adhesive layer (B) has a Tan δ (loss elastic modulus/storage elastic modulus) value of 0.4 to 1.4 in a temperature range of 0 to 100° C.

The larger the Tan δ (loss elastic modulus/storage elastic modulus), the more readily the stress relaxation deformation with respect to the applied stress. If Tan δ (B) is 0.4 or greater, there is little risk, which is desirable, that, being unable to attenuate the distortion affecting the self-adhesive sheet when adhered to a location with surface irregularities, the sheet reverts immediately after or during long-term storage, readily provoking foaming and peeling, and the like. Meanwhile, if Tan δ (B) is 1.4 or less, it is desirable since plastic deformation, that is to say, a deformation from which there is no returning to the original shape, is unlikely to arise, and there is little risk of poor storage stability, or the like, such as overflow of self-adhesive material, deformation, and being prone to scratches.

From such points of view, Tan δ of the pressure-sensitive adhesive layer (B) is all the more preferably 0.5 or greater, or 1.3 or less, and in particular, 0.6 or greater, or 1.2 or less is more desirable.

In order to adjust the Tan δ (loss elastic modulus/storage elastic modulus) of the pressure-sensitive adhesive layer (B), it suffices to adjust, for instance the monomer species to be copolymerized, the composition ratio, and the like, forming the acrylic acid (co)polymer of the base polymer.

<Constituent Material>

From the points of view of adhesiveness, transparency, resistance to weather and the like, the layer in the case of a single layer constitution, or, the intermediate resin layer (A) and the pressure-sensitive adhesive layer (B) in the case of a multilayer constitution, are all preferably formed using a (meth)acrylic acid ester series polymer (hereafter referred to as "acrylic acid ester series (co)polymer" with the meaning of including copolymers) as the base resin, mixing therein a crosslinking monomer and as necessary a crosslinking initiator, a reaction catalyst, or the like, and carrying out a crosslinking reaction.

The acrylic acid ester series (co)polymer serving as the base resin can be prepared by selecting suitably the species and the composition ratio of acrylic monomer or methacrylic monomer used for the polymerization thereof, furthermore, the polymerization conditions, and the like, thereby adjusting suitably physical properties such as the glass transition temperature (Tg) and the molecular weight.

As acrylic monomers or methacrylic monomers used for polymerizing the acrylic acid ester (co)polymer, for instance, 2-ethylhexyl acrylate, n-octyl acrylate, isooctyl acrylate, n-butyl acrylate, ethyl acrylate, methyl (meth) acrylate, and the like, can be given. From the copolymerization of these with a hydrophilic group, an organic functional group, or the like, vinyl acetate, hydroxyethyl acrylate, hydroxybutyl acrylate, acrylic acid, glycidyl (meth) acrylate, acrylamide, acrylonitrile, methacrylonitrile, fluoroacrylate, silicone acrylate, and the like, can also be used.

As polymerization processes using these monomers, well-known polymerization methods such as solution polymerization, emulsification polymerization, bulk polymerization and suspension polymerization can be adopted, and in so doing, a polymerization initiator such as a thermal polymerization initiator or a photopolymerization initiator is used according to the polymerization method, allowing an acrylic acid ester copolymer to be obtained.

Among them, as the base polymer in the present self-adhesive sheet, it is desirable to use an acrylic acid ester (co)polymer comprising a randomly copolymerized monomer composition containing two species of monomer for which the differences in glass transition temperatures (Tg) when they have become homopolymers differ greatly.

In so doing, the difference in glass transition temperature (Tg) between the two species of monomer is preferably 25 to 300° C. and in particular 40 to 200° C., of which in particular 60 to 180° C. and furthermore 100° C. to 180° C. are all the more desirable.

More concretely, it is desirable that the glass transition temperature (Tg) of one of the monomer is −100 to 0° C. and particularly −80 to −20° C., and that the glass transition temperature (Tg) of the other monomer is 0 to 250° C. and particularly 20 to 180° C.

Even more concretely, as the monomer for which the glass transition temperature (Tg) is low, for instance, a monomer for which Tg is −100 to 0° C., it is desirable to use an acrylic acid ester for which the number of side-chain carbons is two or more and particularly four or more. As the other monomer for which the glass transition temperature (Tg) is high, for instance, a monomer for which Tg is 0 to 250° C., it is desirable to use a vinyl monomer, a (meth)acrylic monomer, or the like, having for a side chain, in addition to a hydrocarbon having two carbons, a cyclic structure such as an alicyclic structure, a heterocycle or an aromatic, or a functional group such as a carboxyl group, a hydroxyl group, an amino group, an amido group, a glycidyl group, an acetyl group or an isocyanate group.

In case no solvent is used, since a base polymer having a large molecular weight is difficult to use, the weight average molecular weight of an acrylic acid ester polymer is preferably 100,000 to 700,000, particularly 200,000 to 500,000, of which in particular 250,000 to 500,000.

In addition, in the present self-adhesive sheet, it is desirable that the weight average molecular weight (MW)/number average molecular weight (MN) of the acrylic acid ester polymer is relatively large, particularly 5 to 10, of which in particular 6 to 9 is more desirable.

As the crosslinking monomer (crosslinker) used when crosslinking the acrylic acid ester polymer, for instance, a multifunctional (meth)acrylate having two or more (meth) acryloyl groups, or, a multi-functional organofunctional group resin having two or more organic functional groups such as isocyanate group, epoxy group, melamine group, glycol group, siloxane group and amino group, or, an organometallic compound having a metal complex such as of zinc, aluminum, sodium, zirconium an calcium, or the like, can be cited.

When crosslinking an acrylic acid ester polymer, suitably adding a crosslinking initiator (peroxidation initiator, photoinitiator) or a reaction catalyst (tertiary amine compound, quaternary ammonium compound, tin laurate compound or the like), as necessary, is effective.

As a more specific example, the intermediate resin layer (A) can be formed in the following manner so as to fall in the range of storage elastic moduli described above.

For instance, the intermediate resin layer (A) can be formed by preparing a composition by suitably adding and mixing an acrylic acid ester monomer having two or more reactive groups into an acrylic polymer for which the storage elastic modulus is lower than $1 \times 10^4$ Pa in a temperature range of 0° C. to 100° C., as necessary, suitably adding a crosslinking initiator or a reaction catalyst, and crosslinking the obtained composition thereby elevating the elastic modulus to be adjusted in a given range.

In addition, the intermediate resin layer (A) can be formed by copolymerizing a monomer having a low elastic modulus with a high cohesive strength monomer such as methyl methacrylate or isobornyl acrylate and adjusting the elastic modulus of the main agent per se to a given range.

Also, the storage elastic modulus (G') of the intermediate resin layer (A) can be adjusted by mixing an oligomer having a high storage elastic modulus obtained by polymerizing the above high cohesive strength monomer and a low elastic modulus acrylic polymer such as one described above.

However, there is no limitation to these methods.

Meanwhile, the pressure-sensitive adhesive layer (B) can be formed in the following manner.

For instance, with an acrylic copolymer having a theoretical Tg (glass transition temperature) of 0° C. or lower, and preferably −10° C. or lower, which is in a rubbery domain from 0 to 100° C., serving as the main raw material, adding suitable amounts of various crosslinkers (isocyanate resin, epoxy resin, acrylic acid ester monomer, and the like, which are bifunctional or greater) to an extent that does not affect the fluidity of the main raw material and then proceeding with the crosslinking reaction allows the storage elastic modulus (G') and Tan δ of the pressure-sensitive adhesive layer (B) to be adjusted.

However, there is no limitation to such method.

Although the intermediate resin layer (A) and the pressure-sensitive adhesive layer (B) can be formed from the same constituent material or can be formed from different constituent materials, from the point of view of optical characteristic, for instance, suppressing clouding caused by a difference in the refractive index or non-miscibility that may occur between layers, forming from the same constituent material is desirable. In so doing, the softness as a self-adhesive agent, that is to say, the storage elastic modulus, can be adjusted by adjusting the mixing proportion of each material, the extent of crosslinking or the like.

In addition to the components described above, as necessary, various additives can also be mixed suitably, such as, colorants such as pigments and dyes having near infrared radiation absorption properties, tackifier, antioxidant, anti-aging agent, moisture absorbent, ultraviolet absorber, silane coupler, natural or artificial resins, glass fiber and glass beads.

(Thickness)

The total thickness of the present self-adhesive sheet is preferably 50 μm or greater and 1 mm or less. A thickness of 50 μm or greater allows a step of on the order of 20 μm to be filled, and a thickness of 1 mm or less allows the requirement of thinning to be meet.

In addition, from the point of view of filling a step of on the order of 20 μm, a thickness of 100 μm or greater is all the more desirable, and particularly 150 μm or greater is more desirable.

In addition, from the point of view of meeting the requirement of thinning, a thickness of 500 μm or less, and particularly 350 μm or less, is more desirable.

When a multilayer constitution is rendered in the way described above, it is desirable that the total thickness ratio between each layer from the intermediate resin layer (A) and the pressure-sensitive adhesive layer (B) is 0.5<(A)/(B)<10, and that the total thickness of the pressure-sensitive self-adhesive material layer (B) is 10 μm to 200 μm.

If the total thickness of the intermediate resin layer (A) exceeds the total thickness of the pressure-sensitive self-adhesive material layer (B) times 0.5, which is desirable, the contribution of the thickness of the self-adhesive material layer in the laminate does not become too large and workability pertaining to cutting and handling does not deteriorate due to excessive softness. Meanwhile, if the total thickness of the intermediate resin layer (A) is 10 times the total thickness of the pressure-sensitive self-adhesive material layer (B) or less, which is desirable, the ability to conform to surface irregularities and curved surfaces does not deteriorate and foaming at a step is unlikely occurred immediately after adhesion to an adherend or over time.

From such points of view, a total thickness ratio between each layer from the intermediate resin layer (A) and the pressure-sensitive adhesive layer (B) of 0.75<(A)/(B)<9.5 is all the more desirable, and particularly 1<(A)/(B)<9 is more desirable.

In addition, from the same points of view, a total thickness of the pressure-sensitive adhesive layer (B) of 15 μm or greater or 180 μm or less is all the more desirable, and particularly 20 μm or greater or 150 μm or less is more desirable.

(Transparency)

The present self-adhesive sheet has the characteristic of being transparent. It is to be distinguished from non-transparent self-adhesive sheets such as self-adhesive sheets comprising a foam resin or the like.

(Preparation Method)

The present self-adhesive sheet can be prepared by suitably selecting a base polymer and forming, in the case of a single layer constitution, the layer, or, in the case of a multilayer constitution, the intermediate resin layer (A) and the pressure-sensitive adhesive layer (B), so as to have the desired viscoelastic properties, using a crosslinking method that is appropriate to each.

For instance, selecting an acrylic acid ester polymer as the base polymer, adding a crosslinker and a reaction initiator, a reaction catalyst or the like and mixing by stirring, forming a film over a release film so as to have the target thickness, and crosslinking by heat drying or ultraviolet irradiation, allows an intermediate resin layer (A)-formed sheet or a pressure-sensitive adhesive layer (B)-formed sheet to be obtained.

An intermediate resin layer (A)-formed sheet and a pressure-sensitive adhesive layer (B)-formed sheet can each be prepared in this way and overlapped in a subsequent step to prepare a transparent double-sided self-adhesive sheet as well.

In addition, both or one of the sheets can be prepared and the other composition coated over this sheet to prepare a transparent double-sided self-adhesive sheet as well.

In addition, an intermediate resin layer (A)-forming composition and a pressure-sensitive adhesive layer (B)-forming composition can be coated sequentially in multiple steps over a release film to prepare a transparent double-sided self-adhesive sheet as well.

Further in addition, an intermediate resin layer (A)-forming composition and a pressure-sensitive adhesive layer (B)-forming composition can be co-extruded to prepare a transparent double-sided self-adhesive sheet as well.

The present self-adhesive sheet can also be provided in a morphology comprising release films layered at the front and the back.

In so doing, a cast film or a drawn film of the polyester series, the polypropylene series or the polyethylene series, which has been release-treated by coating a silicone resin thereon, a release paper, or the like, can be suitably selected and used for the release film, and it is desirable to use release films particularly having different peeling strengths or release films having different thicknesses, at the front and the back of the self-adhesive sheet.

In addition, by pre-layering on the reverse side of a protective panel, the present self-adhesive sheet can be provided as a self-adhering protective panel body.

Direct layering onto the protective panel at preparation of the present self-adhesive sheet allows for a tight adhesion leading to a strong surface boundary between the protective panel and the self-adhesive sheet improving durability, and in so doing, it suffices that the present self-adhesive sheet is layered on the release film side first, and then immediately, adhered tightly onto the reverse side of the protective panel and cured.

In so doing, while not to be limited in particular, the curing conditions, for instance, of leaving at room temperature for 7 days, leaving at 40° C. for 3 days, or the like, are sufficient.

A protective panel can be selected from, for instance, glass, acrylic resin, polycarbonate resin, alicyclic polyolefin resin, polyvinyl chloride resin, nylon resin, epoxy resin and styrene resin, and at the front and the back of the protective panel, an anti-reflection treatment, an anti-scattering treatment, a hard-coating treatment, a design (cutting, printing) processing or a touch panel function may have been applied beforehand.

(Application)

Since the present self-adhesive sheet not only is transparent and has front and reverse sides that are self-adhesive surfaces, but has excellent ability to conform to a step caused by a printing site, or the like, and surface irregularities, and, moreover, also has excellent workability such as cutting processability, it can be used suitably for bonding a transparent panel such as a protective panel or a touch panel to an image display panel in flat image display devices that use such image display panels as LCDs, PDPs or ELs, such as, for instance, personal computers, mobile terminals (PDAs), gaming machines, televisions (TVs), car navigation systems, touch panels and pen tablets.

For instance, for display screen or the like of a mobile phone, a constitution is sometimes adopted, in which a polarization film or the like is layered over a liquid crystal display (LCD), and over this, mediated by a self-adhesive agent or sheet, a plastic protective panel is layered. In so doing, on the reverse side of the protective panel, a concealing printed portion (on the order of 5 μm to 20 μm in thickness) is provided in the periphery, and if the self-adhesive agent does not penetrate sufficiently into the inside corners of the stepped portions formed at the edges of the concealing printed portion, air bubble remains, decreasing the legibility of the screen. The present self-adhesive sheet can adhere with no air bubble remaining even if there are surface irregularities of on the order of 15 to 20 μm and obviously on the order of 5 μm to 10 μm, can adhere without foaming under a high temperature environment of, for instance, on the order of 85° C., and therefore has extremely remarkable abilities to follow surface irregularities.

The present self-adhesive sheet or a self-adhering protective panel using this sheet can be used to fabricate an image display device. Using a self-adhering protective panel allows the manufacturing process of an image display device to be cutback, allowing productivity to be improved further.

In addition, since the transparent self-adhesive sheet or the self-adhering protective panel does not become sticky over time after cutting, pre-cutting according to the image display panel is desirable.

In so doing, the cutting method is generally die-cutting by a Thomson blade or cutting with a super-cutter or a laser, and it is more desirable to half-cut the release film on either the front or the back leaving a picture-frame shape in such a way that the release film can be peeled-off readily.

More specifically, mobile phones and mobile gaming machines, or mobile terminals, and the like, can be cited, which are constituted by bonding directly a protective panel and an image display panel, or, a touch panel body and an image display panel, or, a touch panel body and a protective panel, using the present self-adhesive sheet.

Explanation of the Terms and the Like

Note that "sheet", as defined in JIS, refers to a product that is thin and flat with the thickness thereof being small given the length and the width, and generally, "film" refers to a thin and flat product with an arbitrarily limited maximum thickness, the thickness being extremely small compared to the length and width, and generally provided in the form of a roll (Japanese Industrial Standards JIS K6900). However, as the boundary between a sheet and a film is not determined and there is no need in the present invention to distinguish the two by words, in the present invention, "sheet" is deemed included even when referring to "film", and "film" is deemed included even when referring to "sheet".

In addition, when the expression "panel" is used, such as in an image display panel and a protective panel, it includes a plate body, a sheet and a film.

In the present invention, when the description "X to Y" (X and Y are arbitrary numbers) is used, unless expressly indicated otherwise, the meaning "X or greater and Y or lower" along with the meaning "preferably greater than X" or "preferably less than Y" are also included.

In addition, when the description "X or greater" (X is an arbitrary number) is used, unless expressly indicated otherwise, the meaning "preferably greater than X" is included, and when the expression "Y or lower" (Y is an arbitrary number) is used, unless expressly indicated otherwise, the meaning "preferably less than Y" is also included.

EXAMPLE

Hereinafter, description will be given in further details by way of examples and comparative examples; how ever, the present invention is not to be limited to these.

Example 1

With respect to 1 kg of acrylic acid ester copolymer A (Mw=500,000, Mn=62,000, Mw/Mn=8, theoretical Tg: −50° C.) comprising 75 parts by mass of 2-ethylhexyl acrylate (homopolymer Tg: −70° C.), 20 parts by mass of vinyl acetate (homopolymer Tg: 32° C.) and 5 parts by mass of acrylic acid (homopolymer Tg: 106° C.), which had been randomly copolymerized, 150 g of the ultraviolet curable resin propoxylated pentaerythritol triacrylate (ATM-4PL, manufactured by Shin-Nakamura Chemical Co., Ltd.) as a crosslinker and 7 g of 4-methylbenzophenone as a photopolymerization initiator were mixed to prepare an intermediate resin layer composition.

The intermediate resin layer composition was coated with an applicator onto a release-treated polyethylene terephthalate film ("NP50A", manufactured by PANAC Corporation; thickness: 50 μm) so as to have a thickness of 130 μm and then the surface was covered with a release-treated polyethylene terephthalate film (E7006, manufactured by Toyobo Co., Ltd.; thickness: 38 μm).

From both the front and the back sides, 1000 mJ ultraviolet light was irradiated through the polyethylene terephthalate films with a high-pressure mercury lamp to crosslink the intermediate resin layer composition and prepare a 130 μm-thick intermediate resin layer (A-1).

Meanwhile, 20 g of 4-methyl benzophenone as photopolymerization initiator added to 1 kg of the acrylic acid ester copolymer A and mixed to prepare a pressure-sensitive adhesive material composition, which was coated over a release-treated polyethylene terephthalate film ("MRA75", manufactured by Mitsubishi Plastics, Inc.; thickness: 75 μm) and shaped in the form of a sheet so that the thickness was 35 μm, and the surface was covered with a polyethylene terephthalate film to which a release-treatment had been applied ("E7006", manufactured by Toyobo Co., Ltd.; thickness: 38 μm).

From both the front and the back sides, 1000 mJ ultraviolet light was irradiated through the polyethylene terephthalate films with a high-pressure mercury lamp to crosslink the pressure-sensitive adhesive material composition and prepare a 35 μm-thick pressure-sensitive adhesive layer (B-1).

Next, the self-adhesive surfaces exposed by peeling-off the processing release films of pressure-sensitive adhesive layers (B-1) were layered with a laminator on the surfaces exposed by peeling-off the release films on both the front and back sides of the intermediate resin layer (A-1) to prepare a transparent double-sided self-adhesive sheet (thickness: 200 μm; B-1/A-1/B-1=35/130/35).

Example 2

A transparent double-sided self-adhesive sheet (thickness: 160 μm; B-1/A-2/B-1=35/90/35) was prepared in a similar manner to Example 1, except that an intermediate resin layer (A-2) was used, a 90 μm sheet from a block copolymer ("LA2250", manufactured by Kuraray Co., Ltd.) comprising butyl acrylate (Tg: −56° C.) and methyl methacrylate (Tg: 105° C.), which was melted and shaped in the form of a sheet.

Example 3

The intermediate resin layer composition and the pressure-sensitive adhesive layer composition used in Example 1 were melt-co-extruded so as to have pressure-sensitive adhesive layer composition/intermediate resin layer composition/pressure-sensitive adhesive layer composition, and at the same time as this was superposed onto the release-treated side of a release-treated polyethylene terephthalate film ("MRF75", manufactured by Mitsubishi Plastics, Inc.) to be shaped in the form of a 250 μm-thick sheet, it was covered by superposing the release-treated side of a polyethylene terephthalate film to which a release-treatment had been applied ("E7006", manufactured by Toyobo Co., Ltd.). Next, 1300 mJ of ultraviolet light was irradiated from both the front and back sides with a high-pressure mercury lamp through these polyethylene terephthalate films to crosslink the intermediate resin layer composition and the pressure-sensitive adhesive layer composition and produce a self-adhesive sheet laminate (250 μm total thickness: self-adhesive layer/intermediate layer/self-adhesive layer=45 μm/160 μm/45 μm).

Comparative Example 1

The intermediate resin layer composition used in Example 1 was coated with an applicator onto a release-treated polyethylene terephthalate film (manufactured by PANAC Corporation "NP50A" thickness 50 μm) so as to have a thickness of 140 μm and then the surface was covered with a polyethylene terephthalate film to which a release-treatment had been applied ("E7006", manufactured by Toyobo Co., Ltd.; thickness: 38 μm). From both the front and the back sides, 1000 mJ ultraviolet light was irradiated with a high-pressure mercury lamp through the polyethylene terephthalate films to crosslink the intermediate resin layer composition and prepare a 140 μm-thick intermediate resin layer (A-3).

To 1 kg of acrylic acid ester copolymer (Mw=1,100,000) comprising 73 parts by mass of butyl acrylate (Tg: −56° C.), 25 parts by mass of methyl methacrylate (Tg: 105° C.) and 2 parts by mass of acrylic acid (Tg: 106° C.), which had been copolymerized, 0.15 g of a polyisocyanate compound (Asahi Kasei Duranate 24A-100) was added as a crosslinker to prepare a pressure-sensitive adhesive composition as a composition for the pressure-sensitive adhesive layer, this was coated over a release-treated polyethylene terephthalate film ("MRF75", manufactured by Mitsubishi Plastics, Inc.; thickness: 75 µm) and shaped in the form of a sheet so that the thickness was 30 µm, and the surface was covered with a polyethylene terephthalate film to which a release-treatment had been applied ("E7006", manufactured by Toyobo Co., Ltd.; thickness: 38 µm) to produce a pressure-sensitive adhesive layer (B-2).

Next, the self-adhesive surfaces exposed by peeling-off the processing release films of the pressure-sensitive adhesive layers were layered with a laminator on the surfaces exposed by peeling-off the release films on both the front and back sides of the intermediate resin layer (A-3). This was cured for one week with a 23° C. temperature and 50% humidity conditioning to let the pressure-sensitive adhesive layer composition react and crosslink thoroughly to prepare a transparent double-sided self-adhesive sheet comprising pressure-sensitive adhesive layers (B-2) and an intermediate resin layer (A-3) that have been layered (thickness: 200 µm; B-2/A-3/B-2=30/140/30).

Comparative Example 2

The pressure-sensitive adhesive layer composition used in Example 1 was coated onto a release-treated polyethylene terephthalate film ("MRF75", manufactured by Mitsubishi Plastics, Inc.) and shaped in the form of a sheet so as to be 200 µm-thick, and the surface was covered with a polyethylene terephthalate film to which a release-treatment had been applied ("E7006", manufactured by Toyobo Co., Ltd.). Then, from both the front and back faces, 1000 mJ of ultraviolet light was irradiated through the polyethylene terephthalate films to crosslink the pressure-sensitive adhesive layer composition and prepare a transparent double-sided self-adhesive sheet (thickness: 200 µm) comprising the same composition as the pressure-sensitive adhesive layer (B-1).

Comparative Example 3

The intermediate resin layer composition used in Example 1 was coated onto a release-treated polyethylene terephthalate film ("MRF75", manufactured by Mitsubishi Plastics, Inc.) and shaped in the form of a sheet so as to be 200 µm-thick, and the surface was covered with a polyethylene terephthalate film to which a release-treatment had been applied ("E7006", manufactured by Toyobo Co., Ltd.). Then, from both the front and back faces, 1000 mJ of ultraviolet light was irradiated through the polyethylene terephthalate films to crosslink the pressure-sensitive adhesive layer composition and prepare a transparent double-sided self-adhesive sheet (thickness: 200 µm) comprising the same composition as the intermediate resin layer (A-1).

Comparative Example 4

A transparent double-sided self-adhesive sheet (thickness: 195 µm; B-1/A-4/B-1=35/125/35) was produced in a similar manner to Example 1 except that a biaxially-stretched polyethylene terephthalate film ("DIAFOIL T-100", manufactured by Mitsubishi Plastics, Inc.; thickness: 125 µm) was used as the intermediate resin layer (A-4).

[Evaluation]

The transparent double-sided self-adhesive sheets obtained in Examples 1 to 3 and Comparative examples 1 to 4 were evaluated as follows.

(Storage Elastic Modulus)

The dynamic viscoelastic behavior was measured by the shearing method using the "MARS" rheometer manufactured by EKO Instruments Co., Ltd., under the following conditions:
Jigs: 20 mm-diameter parallel plates
Frequency: 1 Hz
Temperature: −50 to 200° C. (measured from −50° C. at a temperature rise speed of 3° C./min)

(Indentation Hardness Measurement)

Processing release films of transparent double-sided self-adhesive sheets were peeled-off, the exposed self-adhesive surfaces were superposed one after the other to layer a plurality of self-adhesive sheets until the thickness was 6 mm±0.3 mm. Then, the front terminal of the ASKER C2L durometer was pressed vertically downward against the exposed self-adhesive surface of the layered self-adhesive sheet using the constant pressure loader CL150 at a load of 1000 g and an indentation speed of 3 mm/second to measure the indentation hardness.

(Processability)

Transparent double-sided self-adhesive sheets were cut with a 50 mm×80 mm Thomson blade using a Thomson die-cutter, and the shape of the cut sheet extremities were visually observed. Then, those with overflowed paste at a sheet extremity were assessed as "x" and those without as "○".

(Reliability)

A 3 mm-wide, 20 µm-thick print was applied at the periphery of a 53 mm×83 mm soda-lime glass to prepare an evaluation glass substrate having a 20 µm print-step at the periphery. In the above processability evaluation, one of the release films of the cut self-adhesive sheet was peeled-off, and the exposed self-adhesive surface was adhered with a hand roller so as to cover the print-step portion of the glass substrate. Next, the remaining release film was peeled-off, an untreated soda-lime glass was press-bonded to the exposed self-adhesive surface under reduced pressure (−0.1 MPa) and then an autoclave treatment (60° C., 0.3 MPa) was performed for finish-adhesion to prepare a laminate.

The laminate was left alone in an ordinary state (23° C. temperature/50% humidity) for one day and then stored for 100 hours in a thermo-hygrostat at 80° C. temperature/85% humidity.

The appearance after storage was observed visually. In so doing, those with foaming or peeling occurring near a print-step were assessed as "x" and those without as "○".

TABLE 1

| | | | Example 1 | Example 2 | Example 3 | Comparative example 1 | Comparative example 2 | Comparative example 3 | Comparative example 4 |
|---|---|---|---|---|---|---|---|---|---|
| Shear | 0° C. | G'(A) | 5.2E+05 | 8.3E+05 | 5.2E+05 | 5.2E+05 | 2.1E+06 | 5.2E+05 | — |
| storage | | G'(B) | 2.1E+05 | 2.1E+05 | 2.1E+05 | 7.1E+05 | | | 2.1E+05 |
| elastic | | G'(A)/G'(B) | 2.4 | 3.9 | 2.4 | 0.7 | | | |

TABLE 1-continued

|  |  |  | Example 1 | Example 2 | Example 3 | Comparative example 1 | Comparative example 2 | Comparative example 3 | Comparative example 4 |
|---|---|---|---|---|---|---|---|---|---|
| modulus | 50° C. | G'(A) | 4.9E+04 | 3.8E+05 | 4.9E+04 | 4.9E+04 | 1.7E+04 | 4.9E+04 | — |
|  |  | G'(B) | 1.7E+04 | 1.7E+04 | 1.7E+04 | 9.3E+04 |  |  | 1.7E+64 |
|  |  | G'(A)/G'(B) | 2.9 | 21.7 | 2.9 | 0.5 |  |  |  |
|  | 100° C. | G'(A) | 2.0E+04 | 2.2E+05 | 2.0E+04 | 2.0E+04 | 6.2E+03 | 2.0E+04 | — |
|  |  | G'(B) | 6.2E+03 | 6.2E+03 | 6.2E+03 | 0.5 |  |  | 6.2E+03 |
|  |  | G'(A)/G'(B) | 3.3 | 36.0 | 6.6E+04 | 0.3 |  |  |  |
| Tan δ (B) | 0° C. |  | 1.0 | 1.0 | 1.0 | 1.2 | 1.0 | 0.8 | 1.0 |
|  | 50° C. |  | 0.7 | 0.7 | 0.7 | 0.1 | 0.7 | 0.5 | 0.7 |
|  | 100° C. |  | 0.7 | 0.7 | 0.7 | 0.2 | 0.7 | 0.3 | 0.7 |
| Thickness | (A) | Intermediate layer | 130 | 90 | 160 | 140 | 200 |  | 125 |
|  | (B) | Self-adhesive layer | 35 | 35 | 45 | 30 |  | 200 | 35 |
|  | Thickness ratio (A)/(B) |  | 3.7 | 2.6 | 3.6 | 4.7 | — | — | 3.6 |
|  | ASKER hardness |  | 35 | 70 | 32 | 42 | 18 | 43 | 85 |
|  | Processability |  | ○ | ○ | ○ | ○ | x | ○ | ○ |
|  | Reliability |  | ○ | ○ | ○ | x | ○ | x | x |
|  | Overall evaluation |  | ○ | ○ | ○ | x | x | x | x |

(Discussion)

Examples 1 to 3 ed to the 20 μm print-step and had both excellent processability and reliability.

Meanwhile, with the storage elastic moduli of the front and back pressure-sensitive adhesive layers being higher than that of the intermediate resin layer, Comparative example 1 had excellent processability; however, with foaming near the printed portion, the ability to conform to steps was poor.

Comparative example 2, being constituted solely by soft pressure-sensitive adhesive layers, had excellent conforming ability to surface irregularities; however, processability was poor, as cutting into chip shape was difficult due to the self-adhesive agent wrapping around the blade at cutting.

While Comparative example 3 had excellent processability, tackiness and softness as a self-adhesive sheet were poor, and with the sheet peeling-off near the print-step, reliability was poor.

With Comparative example 4, while processability was excellent and handling was smooth, reliability was poor, since, with the resin layer serving as the support body being hard, stress attenuation ability was poor, thus the stress attenuation ability of the front and back pressure-sensitive adhesive layers was impaired, being unable to conform to surface irregularities.

From such results and tests results carried out hitherto by inventors, it was found that processability and ability to follow surface irregularities could be established simultaneously by having a higher shear storage elastic modulus (G'(A)) of the intermediate resin layer (A) than the shear storage elastic modulus (G'(B)) of the pressure-sensitive adhesive layer (B), and an indentation hardness (ASKER C2 hardness) of 10 to 80 for the entire sheet.

Among these, it was found that having a shear storage elastic modulus (G') of the intermediate resin layer (A) of $5 \times 10^3$ to $5 \times 10^8$ Pa in a temperature range of 0° C. to 100° C. and a relationship between the shear storage elastic modulus (G'(A)) of the intermediate resin layer (A) and the shear storage elastic modulus (G'(B)) of the pressure-sensitive adhesive layer (B) of 1.1<G'(A)/G'(B)<80 in a temperature range of 0° C. to 100° C., was sufficient.

In addition, it was found that Tan δ (B) of 0.4 to 1.4 in the temperature range of 0° C. to 100° C. was desirable for the pressure-sensitive adhesive layer (B).

In addition, a total thickness ratio of 0.5<(A)/(B)<10 between each layer from the intermediate resin layer (A) and the pressure-sensitive adhesive layer (B) and a thickness of 10 μm to 200 μm for the pressure-sensitive adhesive layer (B) were found to be desirable from the points of view of processability and surface irregularities conforming ability.

Further in addition, from the point of view of conferring suitable extents of softness and cohesive strength as self-adhesive sheet, it was found that, similarly to Example 1, using as a base polymer an acrylic acid ester (co)polymer comprising two or more species of monomer with a difference in glass transition temperature (Tg) of 25 to 300° C., which had been randomly copolymerized, was desirable.

Example 4

An acrylic acid ester copolymer A (Mw=500,000, Mn=62,000, Mw/Mn=8, theoretical Tg: −50° C.) was prepared by randomly copolymerizing 75 parts by mass of 2-ethylhexyl acrylate (homopolymer Tg: −70° C.), 20 parts by mass of vinyl acetate (homopolymer Tg: +32° C.) and 5 parts by mass of acrylic acid (homopolymer Tg: +106° C.).

With respect to 1 kg of this acrylic acid ester copolymer A, 200 g of ultraviolet curable resin pentaerythritol triacrylate (PETIA, manufactured by DAICEL-CYTEC Company, LTD.) as a crosslinker and 15 g of 4-methyl benzophenone as a photopolymerization initiator were mixed to prepare an intermediate resin layer composition.

The intermediate resin layer composition was heat-melted and coated with an applicator onto a release-treated polyethylene terephthalate film ("NP75Z01", manufactured by PANAC Corporation, thickness: 75 μm) so as to have a thickness of 130 μm and then covered with a release-treated polyethylene terephthalate film ("E7006", manufactured by Toyobo Co., Ltd.; thickness: 38 μm). From both the front and the back sides, 1000 mJ ultraviolet light was irradiated through the polyethylene terephthalate films with a high-pressure mercury lamp to crosslink the intermediate resin layer composition and prepare an intermediate resin layer (A-5).

To 1 kg of the acrylic acid ester copolymer A, 20 g of 4-methyl benzophenone was added as photopolymerization initiator and mixed to prepare a pressure-sensitive self-adhesive composition. This pressure-sensitive self-adhesive composition was heat-melted and coated over a release-treated polyethylene terephthalate film ("MRA75", manufactured by Mitsubishi Plastics, Inc., thickness: 75 μm), shaped in the form of a sheet so that the thickness was 35 μm and covered with a polyethylene terephthalate film to which a release-treatment had been applied (Manufactured by Toyobo Co., Ltd. "E7006", thickness 38 μm). From both the front and the back sides, 1000 mJ ultraviolet light was irradiated through the polyethylene terephthalate films with a high-pressure mercury lamp to crosslink the pressure-sensitive adhesive material composition and prepare a pressure-sensitive self-adhesive agent layer (B-1).

In addition, a pressure-sensitive self-adhesive agent layer (B-1') was prepared similarly to the pressure-sensitive self-adhesive agent layer (B-1) except that the coating substrate was changed to a release-treated polyethylene terephthalate film ("MRF50", manufactured by Mitsubishi Plastics, thickness: 50 μm).

The PET films on both sides of the intermediate resin layer (A-5) were peeled-off and removed one after the other while at the same time, a PET film was peeled-off on one side, respectively, of the pressure-sensitive self-adhesive agent layers (B-1) and (B-1'), and the exposed self-adhesive surfaces were bonded to both surfaces of (A-5) one after the other with a laminator to prepare a multilayered self-adhesive sheet (thickness: 200 μm; B-1/A-5/B-1'=35/130/35).

Example 5

A transparent double-sided self-adhesive sheet (thickness: 150 μm; B-1/A-6/B-1'=35/80/35) was prepared in a similar manner to Example 4, except that an intermediate resin layer (A-6) was used, an 80 μm sheet from a block copolymer ("LA2140e", manufactured by Kuraray Co., Ltd.) comprising butyl acrylate (Tg: −56° C.) and methyl methacrylate (Tg: 105° C.), which was melted and shaped in the form of a sheet.

Example 6

With respect to 1 kg of urethane acrylate (EB270, manufactured by DAICEL-CYTEC Company, LTD.), 20 g of 2-hydroxy-2-methyl-1-phenyl-propane-1-one dimer (IRGACURE 127, manufactured by CIBA) was added as a photopolymerization initiator to prepare an intermediate resin layer composition, this was coated over a processing release film ("T-100", manufactured by Mitsubishi Plastics, Inc., thickness: 100 μm) with an applicator so as to have a thickness of 80 μm, 600 mJ ultraviolet light was irradiated with a high-pressure mercury lamp to crosslink the intermediate resin layer composition and prepare an 80 μm-thick intermediate resin layer (A-7).

Next, with respect to 1 kg of an acrylic acid ester polymer (Mw=580,000) comprising 50 parts by mass of butyl acrylate (Tg: −56° C.), 47 parts by mass of 2-ethylhexyl acrylate (Tg: −70° C.) and 3 parts by mass of acrylic acid (Tg: 106° C.), which had been randomly copolymerized, 20 g of nonanediol diacrylate ("V #260", manufactured by Osaka Organic Chemical) as crosslinker and 5 g of 4-methyl benzophenone as crosslinking initiator were added to prepare a self-adhesive composition for pressure-sensitive adhesive layer.

Next, the self-adhesive composition for pressure-sensitive adhesive layer was coated onto a release-treated polyethylene terephthalate film ("MRA75", manufactured by Mitsubishi Plastics, Inc., thickness: 75 μm) with an applicator so as to have a thickness of 35 μm and then the self-adhesive surface thereof was covered with a release-treated polyethylene terephthalate film ("E7006", manufactured by Toyobo Co., Ltd.; thickness: 38 μm). From both the front and back sides, 1000 mJ ultraviolet light was irradiated through this polyethylene terephthalate film with a high-pressure mercury lamp to crosslink the self-adhesive composition for pressure-sensitive adhesive layer and prepare a 35 μm-thick pressure-sensitive self-adhesive agent layer-forming lamination layer (B-3).

In addition, a pressure-sensitive self-adhesive agent layer (B-3') was prepared similarly to the pressure-sensitive self-adhesive agent layer (B-3) except that the coating substrate was changed to a release-treated polyethylene terephthalate film ("MRF50", manufactured by Mitsubishi Plastics, thickness: 50 μm).

The PET film of the intermediate resin layer (A-7) was peeled-off and removed while at the same time, a PET film was peeled-off on one side, respectively, of the pressure-sensitive self-adhesive agent layers (B-3) and (B-3') in the pressure-sensitive self-adhesive agent layer-forming layered sheets 2 and 2', and the exposed self-adhesive surfaces were bonded to both surfaces of (A-7) one after the other with a laminator to prepare a multilayered self-adhesive sheet (thickness: 150 μm; B-3 1A-7/B-3'=35/80/35).

Example 7

The intermediate resin layer composition and the pressure-sensitive adhesive composition used in Example 4 were melt-co-extruded so as to have pressure-sensitive adhesive layer composition/intermediate resin layer composition/pressure-sensitive adhesive layer composition, and at the same time as this was cast on the release-treated side of the release-treated polyethylene terephthalate film (MRF75, manufactured by Mitsubishi Plastics) to be shaped in the form of a 250 μm-thick sheet, it was covered by superposing the release-treated side of a polyethylene terephthalate film to which a release-treatment had been applied ("E7006", manufactured by Toyobo Co., Ltd.). Next, 1300 mJ of ultraviolet light was irradiated from both the front and back sides with a high-pressure mercury lamp through these polyethylene terephthalate films to crosslink the intermediate resin layer composition and the pressure-sensitive adhesive layer composition and produce a self-adhesive sheet laminate (250 μm total thickness: self-adhesive layer/intermediate layer/self-adhesive layer=45 μm/160 μm/45 μm).

Comparative Example 5

To 1 kg of acrylic acid ester copolymer (Mw=1,100,000) comprising 73 parts by mass of butyl acrylate (Tg: −56° C.), 25 parts by mass of methyl methacrylate (Tg: 105° C.) and 2 parts by mass of acrylate (Tg: 106° C.), which have been copolymerized, 0.15 g of a polyisocyanate compound (Asahi Kasei Duranate 24A-100) was added as a crosslinker to prepare a pressure-sensitive adhesive composition as a pressure-sensitive adhesive layer composition. This was coated over a release-treated polyethylene terephthalate film ("MRA75", manufactured by Mitsubishi Plastics, Inc.; thickness: 75 μm) and shaped in the form of a sheet so that the thickness was 25 μm, covered on the surface with a polyethylene terephthalate film to which a release-treatment had been applied ("E7006", manufactured by Toyobo Co., Ltd.; thickness: 38 μm), and then cured under the conditions of 23° C. and 50% RH for one week to prepare a 25 μm-thick pressure-sensitive self-adhesive agent layer (B-4).

In addition, a pressure-sensitive self-adhesive agent layer (B-4') was prepared similarly to the pressure-sensitive self-adhesive agent layer (B-4) except that the coating substrate was changed to a release-treated polyethylene terephthalate film ("MRF50", manufactured by Mitsubishi Plastics, thickness: 50 μm).

A multilayered self-adhesive sheet (thickness: 180 μm; B-4/A-5/B-4'=25/130/25) was prepared similarly to Example 4, using the intermediate resin layer (A-5) produced in Example 4 as the intermediate resin layer.

Comparative Example 6

The pressure-sensitive adhesive layer composition used in Example 6 was coated onto a release-treated polyethylene terephthalate film ("MRF75", manufactured by Mitsubishi Plastics, Inc.) and shaped in the form of a sheet so as to be 180 μm-thick, and the surface was covered with a polyethylene terephthalate film to which a release-treatment had been applied ("E7006", manufactured by Toyobo Co., Ltd.). Then, from both the front and back faces, 1000 mJ of ultraviolet light was irradiated through the polyethylene terephthalate films to crosslink the pressure-sensitive adhesive layer composition and prepare a transparent double-sided self-adhesive sheet (thickness: 180 μm) comprising the same composition as the pressure-sensitive adhesive layer (B-3).

Comparative Example 7

The intermediate resin layer composition used in Example 4 was coated onto a release-treated polyethylene terephthalate film ("MRF75", manufactured by Mitsubishi Plastics, Inc.) and shaped in the form of a sheet so as to be 200 μm-thick, and the surface was covered with a polyethylene terephthalate film to which a release-treatment had been applied ("E7006", manufactured by Toyobo Co., Ltd.). Then, from both the front and back faces, 1000 mJ of ultraviolet light was irradiated through the polyethylene terephthalate films to crosslink the intermediate resin layer composition and prepare a transparent double-sided self-adhesive sheet (thickness: 200 μm) comprising the same composition as the intermediate resin layer (A-5).

Comparative Example 8

A transparent double-sided self-adhesive sheet (thickness: 195 μm; B-1/A-4/B-1'=35/125/35) was prepared in a similar manner to Example 4 except that a biaxially-stretched polyethylene terephthalate film ("DIAFOIL T-100", manufactured by Mitsubishi Plastics, Inc.; thickness: 125 μm) was used as the intermediate resin layer (A-4).

[Evaluation]

The transparent double-sided self-adhesive sheets obtained in Examples 4 to 7 and Comparative examples 5 to 8 were evaluated as follows. Regarding storage elastic modulus, indentation hardness, processability and reliability, evaluation was carried out by similar methods to Examples 1 to 3 and Comparative examples 1 to 4.

(Retention Strength)

A transparent double-sided self-adhesive sheet was cut to 50 mm×100 mm, the release film on one of the sides was peeled-off, the one of the sides of the transparent double-sided self-adhesive sheet was adhered with a hand roller so as to be superposed onto a backing PET film (thickness: 38 μm), and this was cut in the form of a 15 mm-wide×100 mm-long strip to serve as a test strip.

Next, the remaining release film was peeled-off, and adhered with a hand roller against a SUS plate (120 mm×50 mm×1.2 mm-thickness) so that the test strip is superposed only over a length of 20 mm. At this time, the adhesion surface area between the transparent double-sided self-adhesive sheet and the SUS plate was 15 mm×20 mm.

Thereafter, test strip was cured under an atmosphere of 60° C. for 15 minutes, then, a weight of 4.9 N was applied to the test strip in the vertical direction and left alone for 60 minutes, and then, length (mm) by which the adhesion position between the SUS and the test strip shifted downward, that is to say, the amount of creep, was measured.

(Display Unevenness Observation)

Transparent double-sided self-adhesive sheets were cut with a 50 mm×80 mm Thomson blade using a Thomson die-cutter, the self-adhesive surface exposed by peeling-off one of the release films was superposed onto a 0.5 mm-thick soda lime glass and adhered with a hand roller. Next, the remaining release film was peeled-off, a 0.5 mm-thick soda lime glass was superposed onto the exposed self-adhesive surface and press-bonded under reduced pressure (−0.1 MPa), and then an autoclave treatment (60° C., 0.3 MPa, 20 minutes) was performed for finish-adhesion to prepare a laminate.

Hitting the laminate with the light from a projector, the light transmitted through the laminate was visually observed and those in which light-dark from the transmitted light was clearly observed, due to slight unevenness in thickness belonging to the self-adhesive sheet remaining, were evaluated as "x", and those in which unevenness was flattened as "○".

TABLE 2

| | | | Example 4 | Example 5 | Example 6 | Example 7 | Comparative example 5 | Comparative example 6 | Comparative example 7 | Comparative example 8 |
|---|---|---|---|---|---|---|---|---|---|---|
| Constitution | | Pressure-sensitive adhesive layer | B-1 | B-1 | B-3 | B-1 | B-4 | B-3 | A-5 | B-1 |
| | | Intermediate layer | A-5 | A-6 | A-7 | A-5 | A-5 | | | A-4 |
| | | Pressure-sensitive adhesive layer | B-1' | B-1' | B-3' | B-1 | B-4' | | | B-1' |
| Shear storage elastic modulus G'(Pa) | 0° C. | G'(A) | 8.4E+05 | 4.3E+05 | 8.1E+07 | 8.4E+05 | 8.4E+05 | — | 8.4E+05 | Not measurable |
| | | G'(B) | 2.1E+05 | 2.1E+05 | 6.2E+04 | 2.1E+05 | 7.0E+05 | 6.2E+04 | — | 2.1E+05 |
| | | G'(A)/G'(B) | 3.9 | 2.0 | 1295 | 3.9 | 1.2 | — | — | Not measurable |
| | 50° C. | G'(A) | 5.8E+04 | 1.9E+05 | 3.8E+06 | 5.8E+04 | 5.8E+04 | — | 5.8E+04 | — |
| | | G'(B) | 1.7E+04 | 1.7E+04 | 9.8E+03 | 1.7E+04 | 9.3E+04 | 9.8E+03 | — | 1.7E+04 |
| | | G'(A)/G'(B) | 3.4 | 11.1 | 385 | 3.4 | 0.6 | — | — | Not measurable |
| | 100° C. | G'(A) | 2.3E+04 | 8.5E+04 | 3.5E+06 | 2.3E+04 | 2.3E+04 | — | 2.3E+04 | — |
| | | G'(B) | 6.2E+03 | 6.2E+03 | 3.1E+03 | 6.2E+03 | 6.7E+04 | 3.1E+03 | — | 6.2E+03 |
| | | G'(A)/G'(B) | 3.7 | 13.7 | 1134 | 3.7 | 0.3 | — | — | — |

TABLE 2-continued

|  |  |  | Example 4 | Example 5 | Example 6 | Example 7 | Comparative example 5 | Comparative example 6 | Comparative example 7 | Comparative example 8 |
|---|---|---|---|---|---|---|---|---|---|---|
| Tan δ (B) |  | 0° C. | 1.0 | 1.0 | 0.6 | 1.0 | 1.2 | 0.6 | 0.8 | 1.0 |
|  |  | 50° C. | 0.7 | 0.7 | 0.8 | 0.7 | 0.2 | 0.8 | 0.5 | 0.7 |
|  |  | 100° C. | 0.7 | 0.7 | 0.8 | 0.7 | 0.2 | 0.8 | 0.3 | 0.7 |
| Thickness (μm) | (A) | Intermediate layer | 130 | 80 | 80 | 160 | 130 | — | 180 | 125 |
|  | (B) | Self-adhesive layer | 35 | 35 | 35 | 45 | 25 | 180 | — | 35 |
|  |  | Thickness ratio (A)/(B) | 1.9 | 1.1 | 1.1 | 1.8 | 2.6 | — | — | 1.8 |
| Evaluation |  | Indentation hardness | 38 | 56 | 75 | 37 | 45 | 18 | 46 | 85 |
|  | Retention strength | 60 mn shift amount | 3 mm | 2 mm | 2 mm | 4 mm | <1 mm | >15 mm (40 mn drop) | <1 mm | 2 mm |
|  |  | Processability | ○ | ○ | ○ | ○ | ○ | x | ○ | ○ |
|  |  | Reliability | ○ | ○ | ○ | ○ | x | ○ | x | x |
|  |  | Display unevenness observation | ○ | ○ | ○ | ○ | x | ○ | x | ○ |
|  |  | Overall evaluation | ○ | ○ | ○ | ○ | x | x | x | x |

(Discussion)

Examples 4 to 7 conformed to the 20 μm print-step and had excellent processability, reliability and appearance when bonded to an adherend.

Meanwhile, with the storage elastic moduli of the front and back pressure-sensitive adhesive layers being higher than that of the intermediate resin layer, Comparative example 5 had excellent processability; however, with foaming near the printed portion, the ability to conform to steps was poor.

In addition, when sandwiched between 0.5 mm glasses, the appearance was poor, as sufficient plastic deformation of the self-adhesive sheet did not occur immediately after adhesion, microscopic unevenness in thickness that the self-adhesive sheet per se has was not flattened, leading to a non-uniform micro-deformation of the glass, causing fluctuations in the light from the projector and generating display unevenness.

Comparative example 6, being constituted solely by soft pressure-sensitive adhesive layers, had excellent conforming ability to adherend and reliability; however, processability was poor, as cutting into chip shape was difficult due to the self-adhesive agent wrapping around the blade at cutting.

Comparative example 7 had excellent processability; however, tackiness and softness as a self-adhesive sheet were poor, and with the sheet peeling-off near the print-step, reliability was poor. In addition, when sandwiched between 0.5 mm glasses, the appearance was poor, as sufficient plastic deformation of the self-adhesive sheet did not occurred immediately after adhesion, generating display unevenness, similarly to Comparative example 1.

With Comparative example 8, while processability was excellent and handling was smooth, reliability was poor, since, with the resin layer serving as the support body being hard, stress attenuation ability was poor, thus, while slight unevenness in thickness could be countered by the deformation of the front and back pressure-sensitive adhesive layers, the stress attenuation ability of the front and back pressure-sensitive adhesive layers was impaired, being unable to conform to large surface irregularities such as print-steps.

From such results and tests results carried out hitherto by inventors, it was found that processability and ability to follow surface irregularities could be established simultaneously while maintaining a satisfactory appearance when bonded to an adherend, by having an indentation hardness (ASKER C2 hardness) of 10 to 80 for the entire sheet, and an mount of shift by shearing of the self-adhesive surface boundary of 1 mm or greater but less than 15 mm.

The invention claimed is:

1. A transparent double-sided self-adhesive sheet, comprising:
   a self-adhesive composition comprising a (meth)acrylic acid ester copolymer and a photopolymerization initiator,
   wherein the (meth)acrylic acid ester copolymer comprises a first monomer and a second monomer, which are different,
   wherein the first monomer is a low Tg monomer having a glass transition temperature (Tg) in a range of from −100° C. to 0° C. as a homopolymer,
   wherein the second monomer monomers is a high Tg monomer having a glass transition temperature (Tg) in a range of from 20 to 180° C. as a homopolymer,
   wherein a difference in the glass transition temperatures (Tg) between the low Tg monomer and the high Tg monomer is in a range of from 25 to 300° C.,
   wherein the low Tg monomer comprises 2-ethylhexyl acrylate, n-octyl acrylate, isooctyl acrylate, ethyl acrylate, hydroxyethyl acrylate, hydroxybutyl acrylate, and/or glycidyl (meth)acrylate,
   wherein the high Tg monomer comprises acrylamide and isobornyl acrylate,
   wherein the transparent double-sided self-adhesive sheet has:
   a thickness in a range of from 100 μm to 350 μm;
   an indentation hardness, ASKER C2 hardness, of from 10 to 80, and
   a creep value, measured by a method comprising (a) to (d), is in a range from 1 mm to 15 mm:
   (a) adhering one side of the sheet to a vertically standing SUS plate with an adhesion surface area of 15 mm×20 mm,
   (b) curing the sheet under an atmosphere of 60° C. for 15 minutes,
   (c) applying a weight of 4.9 N to the sheet in the vertical direction, and then
   (d) measuring the creep value of an adhesion position at the end of 60 minutes.

2. The sheet of claim 1, wherein the photopolymerization initiator is a benzophenone compound.

3. The sheet of claim 1, wherein the transparent double-sided self-adhesive sheet is suitable for bonding two image display device structural members into one body.

4. The sheet of claim 3, wherein the two image display device structural members are
a protective panel and an image display panel,
a touch panel and an image display panel, or
a protective panel and a touch panel.

5. The sheet of claim 1, comprising a single layer sheet.

6. The transparent double-sided self-adhesive sheet of claim 1, comprising a sheet comprising a first layer and a second layer.

7. The sheet of claim 1, having a Tan δ value in a range of from 0.4 to 1.4 at a temperature in a range of from 0 to 100° C.

8. The sheet of claim 1, comprising layers of release films on each side of the double-sided self-adhesive sheet at the front and the back.

9. The sheet of claim 1, wherein the low Tg monomer comprises the 2-ethylhexyl acrylate.

10. The sheet of claim 1, wherein the low Tg monomer comprises the n-octyl acrylate.

11. The sheet of claim 1, wherein the low Tg monomer comprises the isooctyl acrylate.

12. The sheet of claim 1, wherein the low Tg monomer comprises the ethyl acrylate.

13. The sheet of claim 1, wherein the low Tg monomer comprises the hydroxyethyl acrylate and/or hydroxybutyl acrylate.

14. The sheet of claim 1, wherein the low Tg monomer comprises the glycidyl (meth) acrylate.

15. The sheet of claim 1, further comprising:
an intermediate resin layer (A) comprising the self-adhesive composition; and
a pressure-sensitive adhesive (B), comprising the self-adhesive composition,
wherein a shear storage elastic modulus at a frequency of 1 Hz of the intermediate resin layer (A) is higher than a shear storage elastic modulus of the pressure-sensitive adhesive layer (B) in a temperature range of 0 to 100° C.

16. A method of making an image display device structural member, the method comprising:
adhering the transparent double-sided self-adhesive sheet of claim 1 between two image display device structural members into one body.

17. A method for uniformly bonding a transparent double-sided self-adhesive sheet between two panels, wherein at least one of the two panels comprises a step or other surface irregularity, the method comprising:
interposing the transparent double-sided self-adhesive sheet of claim 1 between the two panels.

18. A flat image display device, comprising:
an image display panel selected from the group consisting of liquid crystal display (LCD), plasma display panel (PDP) and electroluminescent panel (EL); and
the transparent double-sided self-adhesive sheet of claim 1.

19. A method of preparing the transparent double-sided self-adhesive sheet of claim 1, the method comprising:
adding a crosslinker, a reaction initiator, an acrylic acid ester polymer as a base polymer, and optionally a reaction catalyst to form a composition and mixing the composition by stirring, and forming a layer having pre-determined viscoelastic properties and having a thickness, over a release film; and
crosslinking by heat drying or ultraviolet irradiation of the film, thereby forming the transparent double-sided self-adhesive sheet.

20. The method of claim 19, wherein the transparent double-sided self-adhesive sheet comprises a first layer and a second layer, the first and second layers being formed by co-extrusion.

* * * * *